2,765,238

REINFORCING PIGMENTS CONTAINING LIGNIN AND HYDRATED SILICA OR SILICATE

Raymond P. Allen, Akron, Ohio

No Drawing. Application April 26, 1952,
Serial No. 284,635

5 Claims. (Cl. 106—306)

This invention relates to reinforcing pigments which contain (1) lignin and (2) hydrated silica or silicate, preferably in hydrated form. It includes the preparation of such pigments and their use in rubber, and more particularly milled rubber.

According to this invention, reinforcing pigment is produced by precipitating lignin from an aqueous solution in which there is hydrated silica or silicate, or a mixture thereof. The hydrated silica and silicate may be in solution in the aqueous solution or suspended therein in very finely divided form. In the product, lignin is preferably present as a coating. The pigment particles may be coated in any desirable manner. Their surface may first be charged so that the lignin will precipitate on them. Alternatively the lignin may be precipitated simultaneously with the hydrated silica or silicate and be contained within the pigment product as well as coated thereon. Whatever the method of coating, before the lignin-coated pigment is removed from the slurry by filtration or otherwise, the slurry may be heated to near the boiling point in order to more firmly fix the lignin on and around the particles.

The amount of lignin in the product may vary over wide limits. Thus, the coated pigment may contain as little as one part by weight of lignin in one hundred of pigment, although generally it will contain more. Generally the pigment will contain one part by weight of lignin in ten to twenty or twenty-five parts of pigment, but it may contain as much as one part by weight of lignin to one part of pigment.

There are several commercial types of lignin which may be used in the practice of this invention although their application may vary according to differences in their alkalinity, etc. For instance, the lignin may be purified and insoluble in water but soluble in alkali. Other lignin which may be used is a purified sodium salt of lignin which is soluble in water and in alkali. Either of these types may be used in the practice of this invention. The term lignin is used herein generally to include various forms of the substance or mixture of substances which are part of that fraction of woody tissue known as lignin.

Hydrated silica and silicates in finely divided form are known to improve the physical properties of rubber. The reinforcing properties of these pigments is improved by treating them with lignin. A preferred pigment is calcium silicate. Hydrated silica and clays may likewise be used.

Uncoated calcium silicate pigment has certain disadvantages in rubber. For example, it tends to disperse poorly. This is one reason why it has found only limited use in rubber compounding. By coating with lignin, this disadvantage is reduced or eliminated, and the reinforcing properties are improved. Although the silicate ordinarily employed in rubber has been calcium silicate, magnesium silicate and other silicates as well as hydrated silica may be used when treated with lignin. Generally calcium silicate will be preferred because it is less expensive than the other silicates.

Several examples of the preparation of reinforcing pigment follow.

Example 1

As an example of the preparation of the reinforcing pigments of this invention, one may start with a slurry with a total volume of about 14 liters containing approximately 300 grams of precipitated calcium silicate smaller than 0.5 micron in size. To this may be added, with constant stirring, 1200 cc. of a solution containing 24 grams of lignin, followed by 320 cc. of an aqueous solution containing 32 cc. of 75 per cent phosphoric acid, whereupon the lignin will be precipitated on and around the particles of calcium silicate. The coated pigment is separated by filtration, and the slurry may be heated before such separation. The lignin used in this preparation is a purified sodium salt of lignin which is soluble in water and in alkali and sold by West Virginia Pulp and Paper Company as Indulin B. The particles of the lignin-coated product are not substantially larger than the particles of the calcium silicate used in the process, being smaller than 0.5 micron in size.

Example 2

According to another method of preparing reinforcing pigments of this invention, one starts with approximately 2 liters of a slurry containing 450 grams of a finely divided hydrated silica. To this slurry is added, with stirring, approximately 2 liters of a solution containing 50 grams of Indulin B, followed by approximately 1 liter of a solution containing 10 cc. of concentrated sulfuric acid. The lignin is thus precipitated and fixed on and around the particles of hydrated silica. The precipitate is filtered, washed and dried.

Example 3

Clays have been used as reinforcing agents in rubber and they make a desirable pigment base for the preparation of reinforcing pigment according to this invention. It is desirable that the clay be of a type that is free, or substantially free, from agglomerates. Clay in itself has a pronounced and in some respects a desirable reinforcing effect. By coating the clay particles with lignin an improved reinforcing material is obtained. The clay may be coated with lignin in the same general manner as described for coating calcium silicate.

In this example, three grams of sodium hydroxide are added to approximately 2 liters of water, and in this solution is dissolved 50 grams of the alkali-soluble, water-insoluble lignin known as Indulin A, marketed by West Virginia Pulp and Paper Company. The solution of this is aided by heat. Four hundred fifty grams of a reinforcing clay are made into a slurry by stirring into 2 liters of water. To this slurry is added, with stirring, the lignin solution. This is followed by approximately one liter of a solution containing 10 cc. of concentrated sulfuric acid. The lignin is thus precipitated and fixed on and around the particles of clay. The precipitate is filtered, washed and dried either at room temperature or after heating to an elevated temperature.

Example 4

Instead of precipitating the lignin onto suspended pigment particles the lignin and particles may be precipitated simultaneously, or substantially simultaneously, from solution. Thus, alkaline lignin may be added to a solution of water glass, and the silicate may be precipitated together with the lignin by adding a precipitant such as calcium chloride.

For example, the reinforcing pigment may be made by starting with 4 liters of water in the precipitating vessel. To this is added, with suitable stirring, 16 portions of 400 cc. each of an aqueous solution totaling 6400 cc. and containing 840 grams of sodium silicate solution, and 48 grams of Indulin B. The sodium silicate solution is a commercial grade having a specific gravity of approximately 1.4 and a ratio of $SiO_2:Na_2O$ of approximately 3.3. To effect the precipitation there are added, alternately with the 16 portions of this solution, 16 portions of 200 cc. each of an aqueous solution totaling 3200 cc. and containing 165 grams of commercial flake calcium chloride. After the precipitation is complete, the precipitate is filtered, washed and dried.

*Example 5*

Before the precipitation is effected, a suitable acid may be added to the calcium chloride solution, in order to precipitate and fix the lignin more completely on and around the calcium silicate particles. For example, in place of using the plain calcium chloride solution in the example just given, one may add to the 3200 cc. of this solution, 4 cc. of concentrated sulfuric acid. The precipitation is then performed in the same manner described above.

In precipitating the lignin together with the pigment or onto the surface of the pigment, it is desirable to use sulfuric acid because this is the cheapest acid. If this acid is added as a component of the calcium chloride solution in the substantially simultaneous precipitation of the calcium silicate and the lignin, due regard must be exercised that the solubility of calcium sulfate is not exceeded. However, the theoretical amount of sulfuric acid may be exceeded if the acid is mixed with the calcium chloride solution immediately prior to the addition of the solution to the precipitating kettle.

*Example 6*

For example, in place of the 3200 cc. of aqueous calcium chloride solution containing 165 grams of flake calcium chloride in Example 4, one may use 2000 cc. of an aqueous solution containing 165 grams of flake calcium chloride and a second aqueous solution totaling 1200 cc. containing 10 cc. of concentrated sulfuric acid. Using 16 aliquot portions, as in the previously described precipitation, 75 cc. of the sulfuric acid solution is added to each 125 cc. of the calcium chloride solution immediately prior to its addition to the sodium silicate, making a total of 200 cc. in each increment which is added immediately to the precipitating kettle.

Phosphoric acid may be used and it may be desirable to employ an acid such as phosphoric acid or sulfuric acid which forms an insoluble salt with the calcium or other component of the pigment, particularly if such calcium, etc. was present in the reagent used to precipitate the pigment. Other acids such as hydrochloric acid, and even organic acids, may be used where feasible. The acid in this example functions as a precipitating and fixing agent for the lignin. An acid may be used also either alone or in combination with the calcium chloride, as a precipitating agent for both the $SiO_2$ radical from the sodium silicate and as a precipitating and fixing agent for the lignin.

*Example 7*

For example, in place of the 3200 cc. of aqueous calcium chloride solution containing 165 grams of flake calcium chloride in Example 4, one may use a total of 3200 cc. of solution containing 82.5 grams of flake calcium chloride plus 85.5 cc. of concentrated hydrochloric acid which contains approximately 40 per cent of HCl. Thus, in this example one-half of the precipitating action is performed by the calcium chloride and one-half by the hydrochloric acid. In the precipitating solution the quantity of calcium chloride may be decreased still further, and the quantity of hydrochloric acid may be correspondingly increased, so that substantially all hydrated silica is precipitated.

The precipitation, according to any of the described procedures, usually is performed at room temperature. After precipitation the filtration may be done at room temperature or the slurry may be heated in order to more completely fix the lignin on and around the pigment particles.

Generally the amount of lignin employed will not be sufficient to have an appreciable effect on the size of the pigment particles. Generally speaking, the pigment particles used as reinforcing agents in rubber will average 0.5 micron or less in the largest dimension. Although the pigment may contain some larger particles, it will be substantially free of particles measuring five or ten microns in the largest dimension.

The lignin-containing pigment—whether or not the lignin be present as a coating—may be employed in the same manner as other reinforcing agents. To the extent that this pigment has greater reinforcing properties than those formerly used, the same reinforcement is obtained by using less of the pigment, or greater reinforcement is obtained by using the same amount of pigment. In general, up to thirty or forty or fifty or more parts by weight of the reinforcing pigment will be used per one hundred parts of rubber for tread stock. In the manufacture of soles and heels it will generally be desirable to use more than fifty parts by weight of the pigment as, for example, sixty to seventy parts or even up to one hundred parts per one hundred parts of rubber.

The following data compares the effect of lignin-coated pigment with uncoated pigment in rubber.

|  | Formula 1, parts by wt. | Formula 2, parts by wt. |
|---|---|---|
| Rubber | 93.0 | 93.0 |
| Zinc oxide | 5.6 | 5.6 |
| Stearic acid | 2.0 | 2.0 |
| Sulfur | 5.0 | 5.0 |
| Di-phenyl guanidine | 0.7 | 0.7 |
| Lignin-coated pigment | 63.5 |  |
| Untreated pigment |  | 63.5 |

The lignin-coated pigment was prepared as described in Example 1, by precipitation from an aqueous suspension of calcium silicate containing alkaline lignin.

A suitable cure for this compound is 45 minutes at 280° F. in a suitable mold, the nature of the composition and cure being variable.

The quantity of the pigment in these formulae corresponds to a loading of 30 volumes of pigment to 100 volumes of rubber. The lignin-coated pigment shows improved physical properties as compared to the untreated pigment, the values for each being recorded below:

| Property | Formula 1 | Formula 2 |
|---|---|---|
| Modulus (300%) | 1,050 | 900 |
| Modulus (500%) | 2,220 | 1,980 |
| Tensile strength | 2,570 | 2,400 |
| Elongation at Break (percent) | 543 | 570 |
| Tear Resistance | 498 | 391 |

In the foregoing modulus and tensile strength are measured in pounds per square inch. The tear resistance is measured in pounds per inch thickness.

The dispersing quality of the lignin-coated pigment is exceptionally good and relatively large quantities may be incorporated in rubber. For example, the amount of lignin-coated pigment in Formula 1 may be nearly doubled without the addition of any further softener so that the total amount is 105 grams, corresponding to a volume loading of 50 to 100 volumes of rubber. This results in a rubber compound with greatest stiffness and greater hardness and with equal tear resistance, qualities which are all desirable for an exceptionally good shoe sole stock.

The rubber compound and formula may of course be varied, using different accelerators and antioxidants, etc. Fillers, dyes, etc. may be employed. The formulae given are illustrative and are not to be construed in a limiting sense.

What I claim is:

1. The process of preparing lignin-containing reinforcing pigment which comprises adding an aqueous precipitant supplying calcium ion to an aqueous alkaline silicate solution containing dissolved lignin and thereby precipitating both the silicate and the lignin.

2. The pigment produced by the method of claim 1.

3. The process of claim 1 in which the calcium precipitant is acid calcium chloride.

4. The process of preparing lignin-containing reinforcing pigment which includes adding an acid to an alkaline aqueous solution of silicate and lignin and obtaining a precipitate.

5. The process of preparing lignin-containing reinforcing pigment which comprises mixing an aqueous acid calcium salt solution to an alkaline aqueous solution of silicate and lignin.

References Cited in the file of this patent

UNITED STATES PATENTS

| | | |
|---|---|---|
| 2,200,784 | Wallace | May 14, 1940 |
| 2,382,742 | Patch | Aug. 14, 1945 |
| 2,560,041 | Draman | July 10, 1951 |
| 2,572,884 | Pollak | Oct. 30, 1951 |
| 2,575,061 | McMahon | Nov. 13, 1951 |
| 2,599,093 | Craig | June 3, 1952 |
| 2,608,537 | Pollak | Aug. 26, 1952 |
| 2,649,388 | Wills et al. | Aug. 18, 1953 |

FOREIGN PATENTS

| | | |
|---|---|---|
| 63,142 | Netherlands | Apr. 16, 1949 |

OTHER REFERENCES

Raff Rubber Age, November 1948, pages 197–200.